(12) United States Patent
Cappozzo

(10) Patent No.: US 11,642,701 B2
(45) Date of Patent: May 9, 2023

(54) DISC SCREEN FOR SEPARATING SOLID MATERIALS

(71) Applicant: ECOSTAR S.R.L., Sandrigo (IT)

(72) Inventor: Domenico Cappozzo, Sandrigo (IT)

(73) Assignee: ECOSTAR S.R.L., Sandrigo (IT)

( * ) Notice: Subject to any disclaimer, the term of this patent is extended or adjusted under 35 U.S.C. 154(b) by 0 days.

(21) Appl. No.: 17/346,309

(22) Filed: Jun. 14, 2021

(65) Prior Publication Data

US 2021/0387232 A1  Dec. 16, 2021

(30) Foreign Application Priority Data

Jun. 12, 2020 (IT) .................... 102020000014104

(51) Int. Cl.
B07B 1/15 (2006.01)

(52) U.S. Cl.
CPC ..................... B07B 1/15 (2013.01)

(58) Field of Classification Search
CPC ......... B07B 1/15; B07B 1/155; B07B 1/4636; B07B 1/4645; B07B 1/50
See application file for complete search history.

(56) References Cited

U.S. PATENT DOCUMENTS

| | | | |
|---|---|---|---|
| 4,795,036 A * | 1/1989 | Williams | B07B 1/15 209/672 |
| 8,424,684 B2 * | 4/2013 | Campbell | B07B 1/4627 209/672 |
| 8,627,962 B2 * | 1/2014 | Cappozzo | B07B 1/50 209/672 |
| 9,238,254 B1 * | 1/2016 | Davis | B07B 1/15 |
| 10,307,793 B2 * | 6/2019 | Parr | D21D 5/046 |
| 11,305,314 B2 * | 4/2022 | Tazzoli | B07B 1/155 |
| 11,351,573 B2 * | 6/2022 | Cappozzo | B07B 1/15 |
| 2006/0180524 A1 * | 8/2006 | Duncan | B07B 1/15 209/672 |
| 2011/0108467 A1 * | 5/2011 | Campbell | B07B 1/14 209/522 |
| 2016/0318070 A1 * | 11/2016 | Davis | B07B 1/155 |
| 2017/0304868 A1 * | 10/2017 | Parr | D21D 5/046 |

FOREIGN PATENT DOCUMENTS

| | | |
|---|---|---|
| CN | 110813694 A | 2/2020 |
| EP | 0169945 A1 | 5/1986 |
| EP | 1106264 B1 | 1/2005 |
| GB | 2072049 A | 9/1981 |
| WO | 2019197969 A2 | 10/2019 |

* cited by examiner

Primary Examiner — Joseph C Rodriguez
(74) Attorney, Agent, or Firm — Mark M. Friedman

(57) ABSTRACT

Disc screen for separating solid residues, which includes multiple parallel rotation shafts, each of which carries a plurality of discs fixed thereto. In addition, the disc screen includes multiple shaped rings, which are each constituted by multiple sectors removably mounted around the rotation shafts, and they are placed between the discs in order to simply and easily vary the screening section. The external edge of each shaped ring is provided with thrust sections, which are adapted to intercept the material to be screened in order to subject the latter to a greater stress, which facilitates a more efficient separation of the materials, and push upward components of light and filamentous material so as to prevent possible entangling and obstructions of such materials at the rotation shafts.

11 Claims, 8 Drawing Sheets

DISC SCREEN FOR SEPARATING SOLID MATERIALS

FIELD OF APPLICATION

The present invention regards a disc screen for separating solid materials.

The present disc screen is intended to be used, in a per se conventional manner, for separating solid materials of various type, such as for example: solid urban waste, inert fluvial material, products of the organic fractions of separate waste collection, compost (for the refining thereof), recycled wood, biomass, inert material, demolition material, land drainage material and dump material, glass, plastic, scrap metal and still other materials.

The disc screen according to the invention is therefore inserted in the industrial field of treating solid residues and is advantageously intended to be installed downstream of the crushing or grinding plants for the same residues.

STATE OF THE ART

Hereinbelow, with the term "residues", any one solid material that requires being separated into its components based on the dimensions or on the mass will be indiscriminately indicated, and for the sake of description brevity.

Known on the market are numerous different apparatuses intended to be employed for separating solid residues in multiple application fields, which employ different structural and operational principles. Several examples of such apparatuses comprise: disc screens, mesh screens, screw screens, drum screens, ballistic separators, fluid bed separators, electrostatic separators, magnetic separators and still other apparatuses.

In particular, the disc screens comprise a support structure which rotatably carries, mounted thereon, numerous shafts equidistant in succession, parallel to each other and actuatable to rotate in a same rotation sense. Axially fixed on each shaft is a group of discs separated from each other by a distance at least equal to, preferably greater than, the thickness of the single discs in order to allow interposing the mounted discs on the contiguous shafts, such that each disc of any one shaft is interposed between two discs of the adjacent front and rear shafts. One example of such disc screens of known type is described in the patent application WO 2019/197969 A1.

In the present field of the art, one measuring item which distinguishes the characteristics of the disc screen is the screening surface. The latter is defined as the area of the openings delimited between the discs and the rotation shafts and is therefore indicative of the sizing of the residues which are separated from the screen, falling via gravity below the screening surface.

Known from the patent EP 1106264 is a disc screen provided with idle sleeves mounted around each shaft and interposed between the discs, having the function of preventing or at least limiting the obstruction of the screening surface.

More in detail, each sleeve is axially mounted on the shaft between two discs with the clearance adapted to allow it to freely rotate in an idle manner on the shaft or on a tubular body provided outside the shaft.

In operation, possible filiform elements, which are externally twisted around the idle sleeves up to affecting the discs mounted on the contiguous shafts, would not compromise the operation of the screen nor could they determine the stoppage thereof since each sleeve, being idle with respect to the shaft on which it is mounted, would not obstruct the rotation of the shaft itself.

The disc screens of known type, described above, have in practice demonstrated that they do not lack drawbacks.

A first drawback is tied to the poor versatility if it is requested to modify or adjust the screening surface, for example in order to treat different residues containing materials of different piece sizes. Indeed, the aforesaid screens of known type require long and complex operations for dismounting the idle sleeves and the discs fit on the shafts in order to substitute them with others of different dimensions, so as to to modify the screening surface.

A further drawback of the screens of known type discussed above is due to the fact that they do not have a high efficiency in separating plastic materials of different sizing, and in particular of the plastic materials for shopper bags, packages, bags, etc. More in detail, several types of plastic material (e.g. the aforesaid materials for shopper bags, packages, bags) but also any flexible sheet-like plastic material, could be fitted between the discs of the screen and generate problems in the operation of the screen and also increase the times and costs of maintenance. The disc screens of known type have a low capacity to direct the aforesaid types of residues towards the advancing direction, which can thus be undesirably screened, or they can be inserted between the discs or even be twisted around the discs and the rotation shafts, causing the stoppage of the screen for a manual removal thereof.

The document EP 0169945 A1 describes a disc screen of known type applied to a combine harvester machine in order to advance the cut herbaceous plants and separate the grain. The discs of such screen are provided with projecting tips in order to facilitate the advancing of the herbaceous plants. However, the latter solution of known type is unable to resolve the aforesaid technical problems since, in particular, the flexible plastic materials would tend to cling to the tips of the discs and be driven towards the rotation shafts, leading to the obstruction of the screen.

PRESENTATION OF THE INVENTION

In this situation, the problem underlying the present invention is therefore that of eliminating the problems of the abovementioned prior art, by providing a disc screen for separating solid materials which allows operating in an efficient manner with many different types of solid residues, in particular allowing the easy modification of the section of the screening surface, simultaneously ensuring a high capacity to separate with respect to the desired sizes.

A further object of the present invention is to provide a disc screen for separating solid materials, which is capable of eliminating or significantly reducing the drawbacks due to the twisting of filiform elements around the discs and the rotation shafts, in particular drastically reducing repeated maintenance operations.

A further object of the present invention is to provide a disc screen for separating solid materials, which has a high efficiency of separation between plastic materials having different sizing.

A further object of the present invention is to provide a disc screen for separating solid materials, which is entirely reliable in operation over time.

A further object of the present invention is to provide a disc screen for separating solid materials, which is inexpensive to make.

BRIEF DESCRIPTION OF THE DRAWINGS

The technical characteristics of the finding, according to the aforesaid objects, and the advantages thereof, will be more evident in the following detailed description, made with reference to the enclosed drawings, which represent several merely exemplifying and non-limiting embodiments of the invention, in which.

DETAILED DESCRIPTION OF A PREFERRED EMBODIMENT

Figure 1:
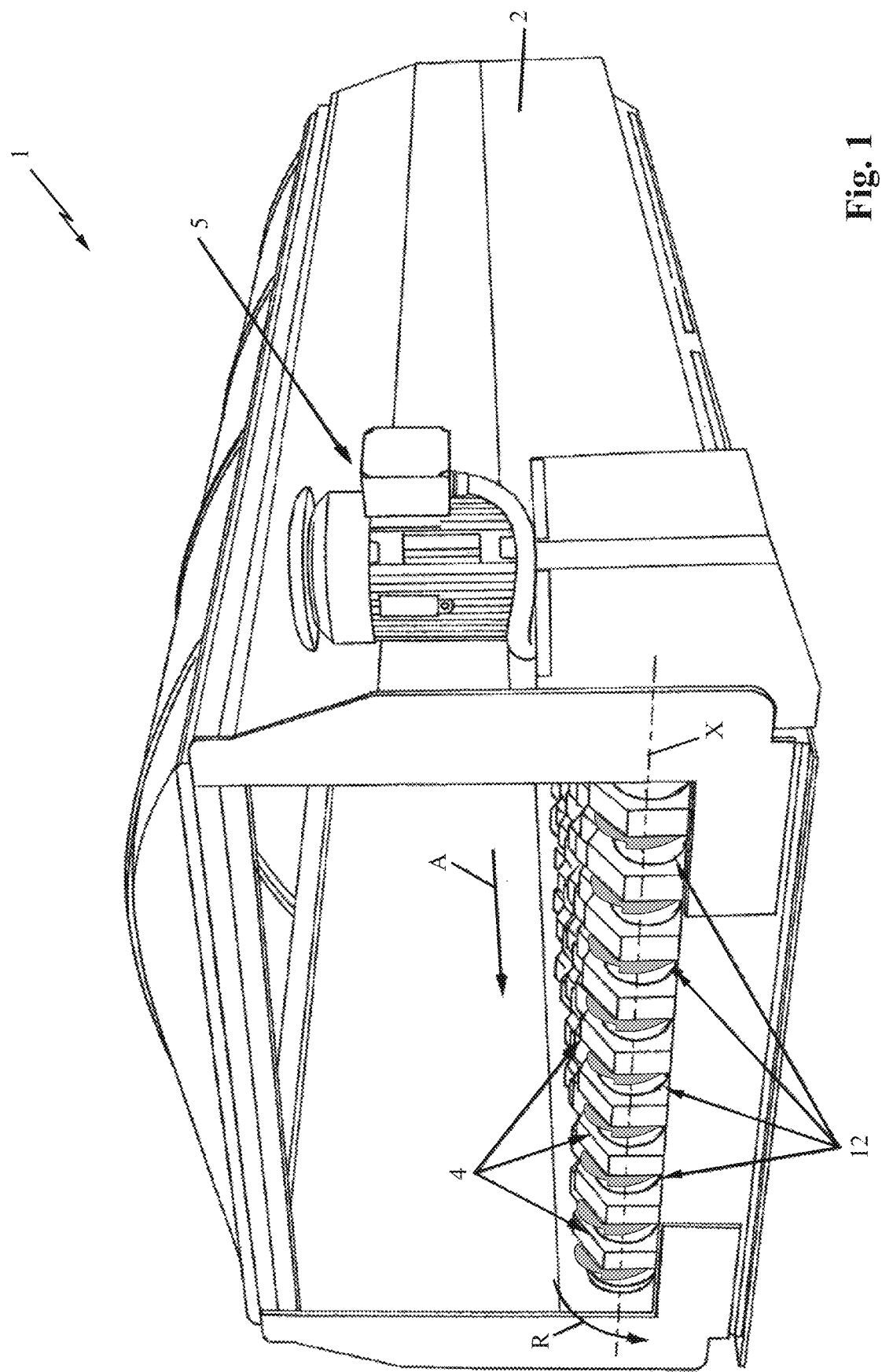
FIG. 1 shows a schematic perspective view of the disc screen for separating solid materials, according to the present invention.

With reference to the enclosed drawings, reference number 1 overall indicates a disc screen for separating solid materials, object of the present invention.

The disc screen 1 according to the present invention is adapted to be employed for separating solid materials of various type such as: solid urban waste, inert fluvial material, products of the organic fractions of the separate waste collection, compost (for the refining thereof), recycled wood, biomass, inert material, demolition material, land drainage material and dump material, glass, plastic, scrap metal and still other materials.

In particular the present disc screen 1 is particularly suitable for separating plastic waste from the remaining solid material mass.

In accordance with the embodiments illustrated in the enclosed figures, the present disc screen 1 comprises a support structure 2, intended to be abutted against the ground, and extended between an inlet door and an outlet door, according to an advancing direction A along which the solid materials to be screened are susceptible to proceed.

The disc screen 1 also comprises a plurality of rotation shafts 3, which are rotatably mounted on the support structure 2 that are parallel to each other, and are placed in succession along the advancing direction A, spaced one from the next, in particular with constant spacing pitch.

Advantageously, each of the rotation shafts 3 is longitudinally extended according to an extension axis X thereof, preferably horizontal and orthogonal to the advancing axis A. In particular, the extension axes X of the rotation shafts 3 identify a screening surface, preferably horizontal in accordance with the embodiments illustrated in the enclosed figures, but which can also take on a tilt, without departing from the protective scope of the present patent.

According to the present invention, the disc screen 1 also comprises a plurality of discs 4, which are axially fixed in succession along the rotation shafts 3 in order to receive a rotational motion from the latter.

More in detail, each rotation shaft 3 carries, fixed thereto (and preferably fitted), multiple corresponding discs 4 placed in succession along the extension axis X of the rotation shaft 3 itself.

The discs 4 are positioned along the corresponding rotation shaft 3 spaced one from the next, preferably with constant pitch.

Each disc 4 is provided with a first rotation axis R1 thereof parallel to the extension axis X of the corresponding rotation shaft 3 and, preferably, coinciding with such extension axis X.

Figure 2:
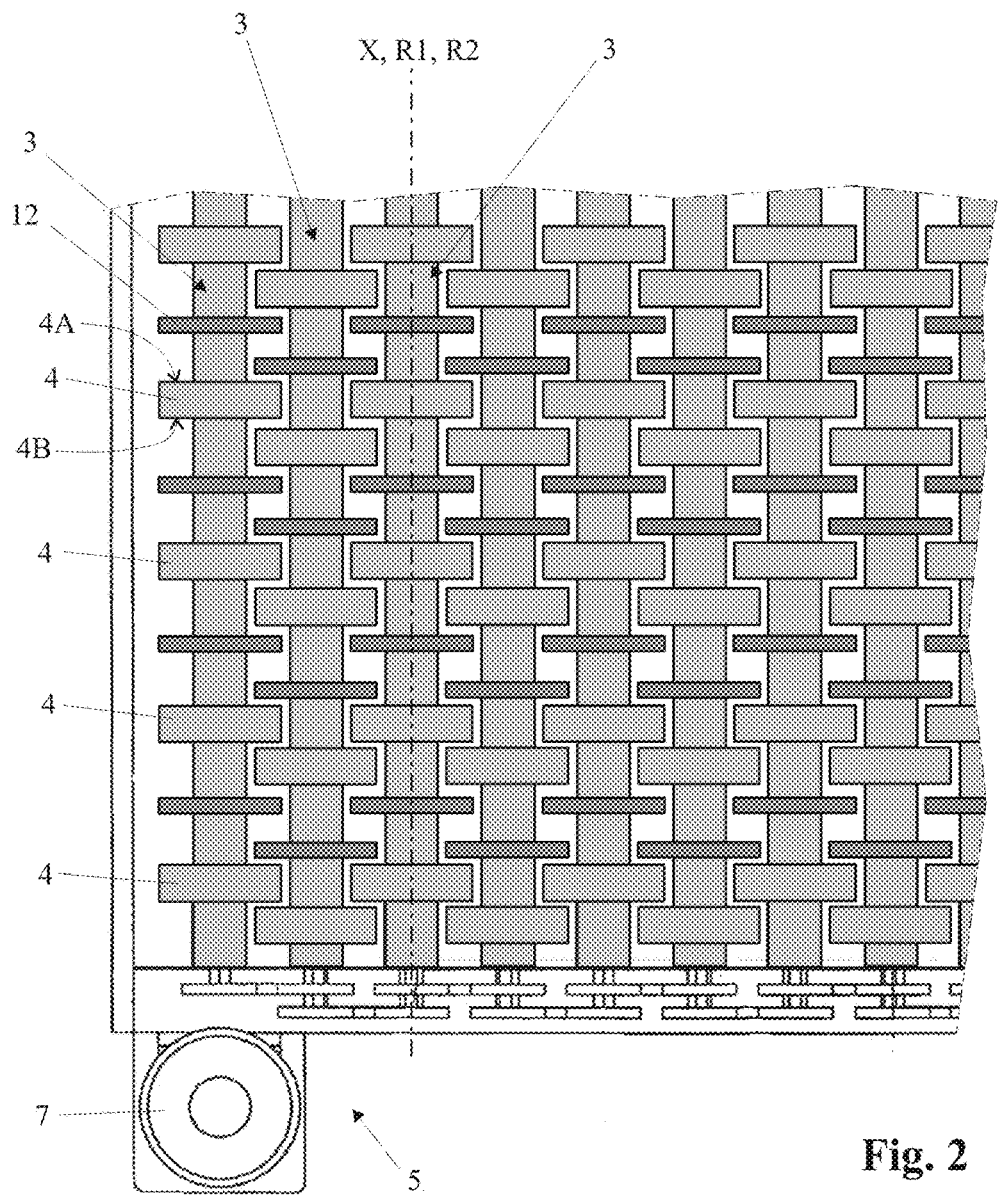
FIG. 2 shows an enlarged detail of the disc screen of FIG. 1 in a schematized plan view, relative to several rotation shafts with a plurality of discs mounted thereon.
Figure 9:
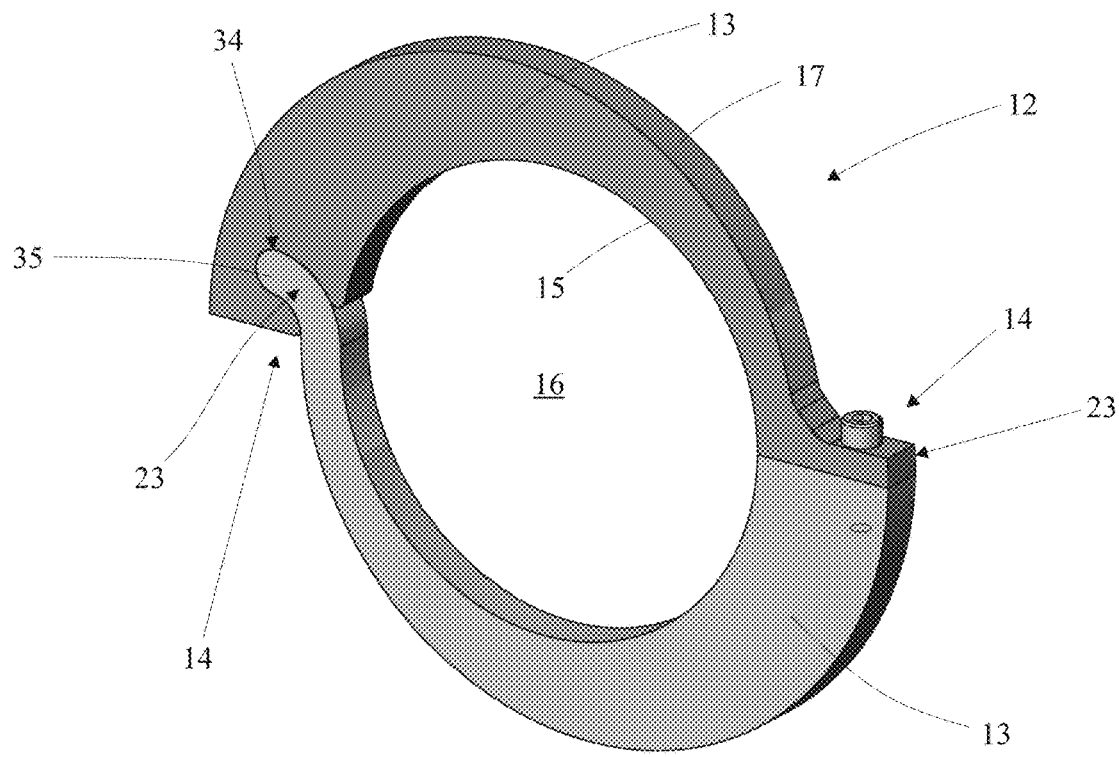
FIG. 9 shows a perspective view of a shaped ring of the present disc screen, in accordance with a third embodiment variant.
Figure 10:
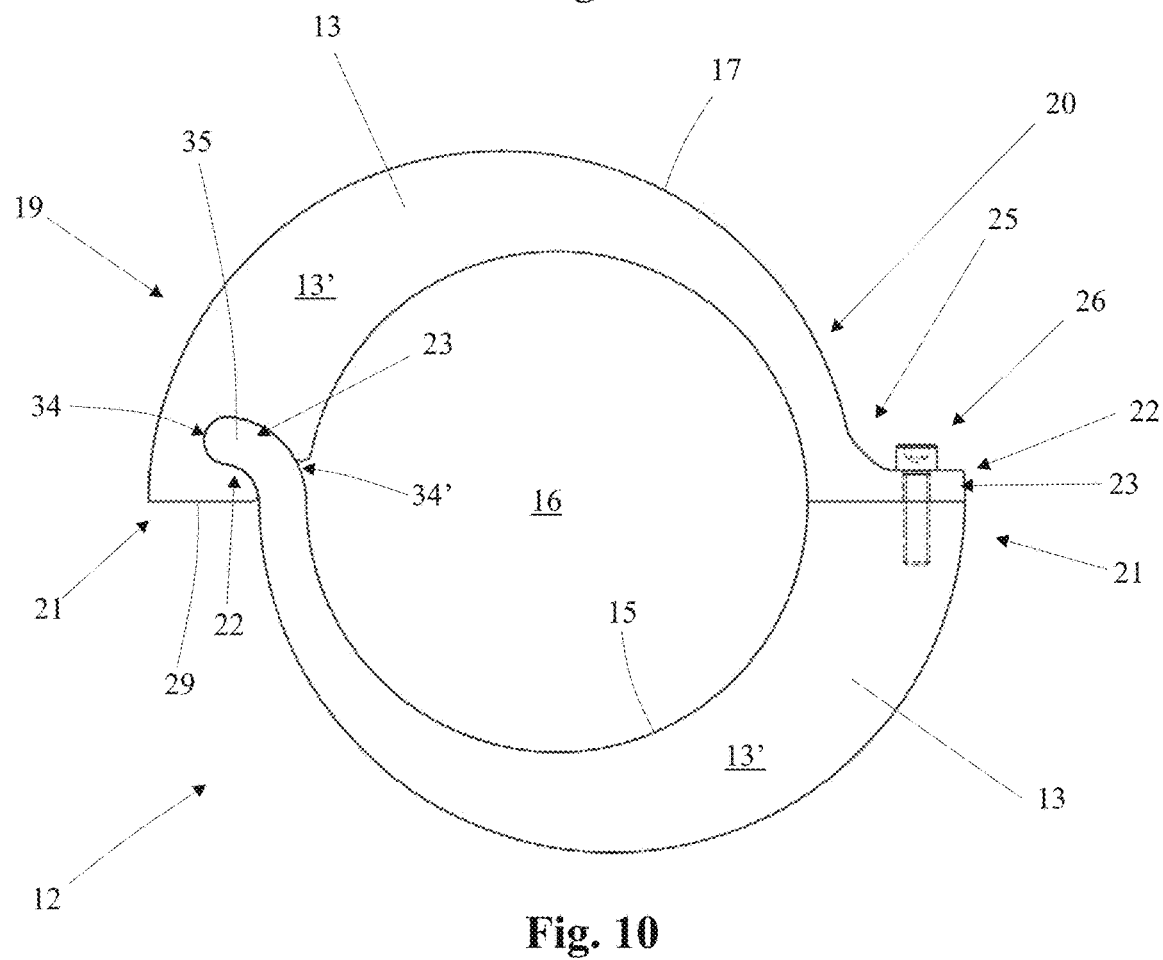
FIG. 10 shows a side view of the shaped ring of FIG. 9.

In particular, as is visible for example in the views of FIGS. 2, 9 and 10, the distance between each disc 4 and the next is greater than the thickness (according to the extension axis X) of each single disc 4, in order to allow interposing between two adjacent discs 4, mounted on the same rotation shaft 3, a disc 4 mounted on the successive rotation shaft 3 according to the advancing direction A, and simultaneously leaving a lateral space SL between each of the two discs 4 of the rotation shaft 3 and the interposed disc 4 of the successive rotation shaft 3. For such purpose, the discs 4 mounted on each rotation shaft 3 are mounted offset with respect to the discs 4 mounted on the successive rotation shaft 3, such that they can be interposed therebetween.

In particular, the distance between the rotation shafts 3 along the advancing direction A and the distance between the discs 4 along the first rotation axis R1 (and in particular the aforesaid lateral space SL) define the screening section of the disc screen 1, which determines the maximum sizing (dimension) of the materials that are sifted (passing below the rotation shafts 3), while the larger-size materials are conveyed towards the outlet door of the disc screen 1.

Figure 3:
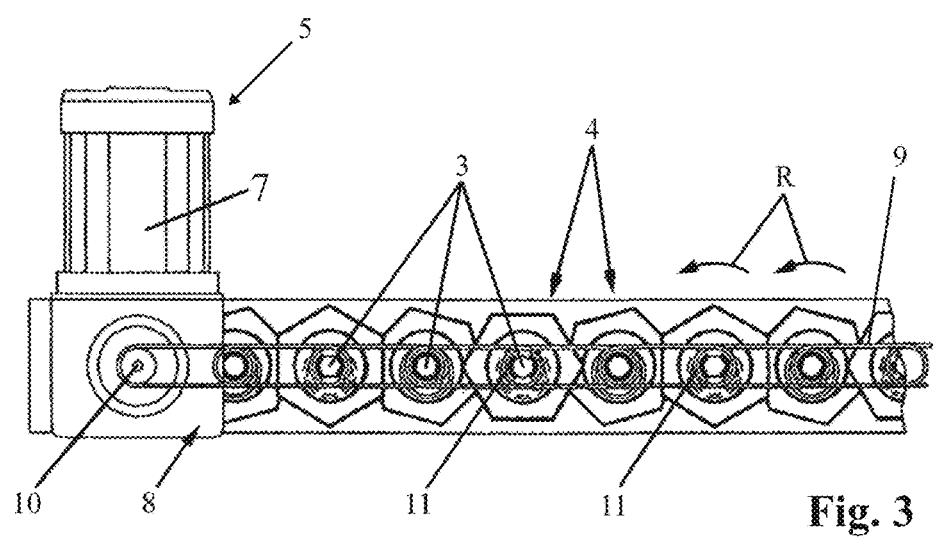
FIG. 3 shows the detail of FIG. 2 in a side view.

According to the invention, the disc screen 1 comprises a drive system 5 mechanically connected to the rotation shafts 3 in order to actuate each disc 4 to rotate around the first rotation axis R1 thereof in a specific rotation sense R (represented for example in FIGS. 1 and 3).

More in detail, the drive system 5 is arranged in order to rotate each rotation shaft 3 around the extension axis X thereof in the aforesaid rotation sense R, in a manner such that each rotation shaft 3 carries in rotation discs 4, fixed thereon. For such purpose, in particular, the discs 4 are mechanically rigidly coupled to the corresponding rotation shaft 3 in order to receive the rotation motion thereof. In particular, the rotation of the discs 4 in the aforesaid rotation sense R is such to determine an advancing sense of the residue material along the advancing direction A from the inlet door to the outlet door of the support structure 2 of the disc screen 1, in a manner per se entirely conventional and for this reason not described in more detail.

For example, with reference to the particular embodiment illustrated in FIGS. 2 and 3, the drive system 5 comprises an electric motor 7 and a motion transmission 8 mechanically connected to the electric motor 7 and to the rotation shafts 3. Preferably, such motion transmission 8 in turn comprises a chain 9 wound as a closed loop and being engaged with a pinion 10 fixed to the shaft of the electric motor 7 and to toothed wheels 11 fitted on each rotation shaft 3.

The drive system 5 is adapted to move all the rotation shafts 3 in the same rotation sense R in order to move, as stated above, the solid material to be screened, accompanied by the rotation of the discs 4, from the inlet door to the outlet door of the disc screen 1.

In particular, the discs 4 are provided with an external section, advantageously convex, e.g. polygonal, which, as better described hereinbelow, is preferably suitably shaped so as to facilitate the advancement of the solid material along the screening plane along the advancing direction A.

Advantageously, each disc 4 is extended (according to the first rotation axis R1) between two opposite external lateral faces 4A and 4B, which delimit between them the thickness of the disc 4 itself.

In particular, the two lateral faces 4A, 4B of each disc 4 are substantially orthogonal to the rotation axis Y, preferably parallel to each other, and are directed (towards the exterior of the disc 4) in opposite senses with respect to each other.

Suitably, each disc 4 is made of rigid material (e.g. metallic) that is sufficiently solid to sustain the stresses during the operation of the disc screen 1 (in a per se known manner).

For example, each disc 4 comprises a rigid body extended without interruption around its first rotation axis R1 and provided with a central hole crossed by the corresponding rotation shaft 3 (coupled to the latter for example via mortise joint).

According to the idea underlying the present invention, the disc screen 1 comprises multiple shaped rings 12, and each of which is removably mounted around the corresponding rotation shaft 3, is provided with a second rotation axis R2 parallel to the extension axis X corresponding rotation shaft 3, and in particular coinciding with the first rotation axis R1 of the discs mounted on the same corresponding rotation shaft 3.

Each shaped ring 12 is positioned between two successive discs 4 mounted on the same corresponding rotation shaft 3. Of course, without departing from the protective scope of the present patent, between two successive discs 4 of a same rotation shaft 3, a shaped ring 12 (such as in the example of FIG. 2) or even multiple shaped rings 12 can be placed, as a function of the specific application requirements.

In particular, as is visible from the example of FIG. 2, each shaped ring 12 occupies part of the lateral space SL between two discs 4 of successive rotation shafts 3, therefore participating in defining the screening section of the disc screen 1.

Each shaped ring 12 is actuatable by the corresponding rotation shaft 3 to rotate around the second rotation axis R2 in the aforesaid rotation sense R. In particular, each shaped ring 12 is connected to the corresponding rotation shaft 3 in a manner such that the latter can transmit to the shaped ring 12 part of its rotation motion, bringing the shaped ring 12 to rotate in the aforesaid rotation sense R.

Advantageously, as described in detail hereinbelow, the shaped rings 12 can be mounted on the rotation shafts 3 of screens of different type, for example both directly (of FIG. 9), and indirectly through the interposition of sleeves 40 externally mounted on the rotation shafts 3 between pairs of successive discs 4 (as illustrated in the example of FIG. 10).

Operatively, therefore, each shaped ring 12 is susceptible of rotating around the second rotation axis R2 in the rotation sense R, following the rotation of the corresponding rotation shaft 3.

Figure 4:
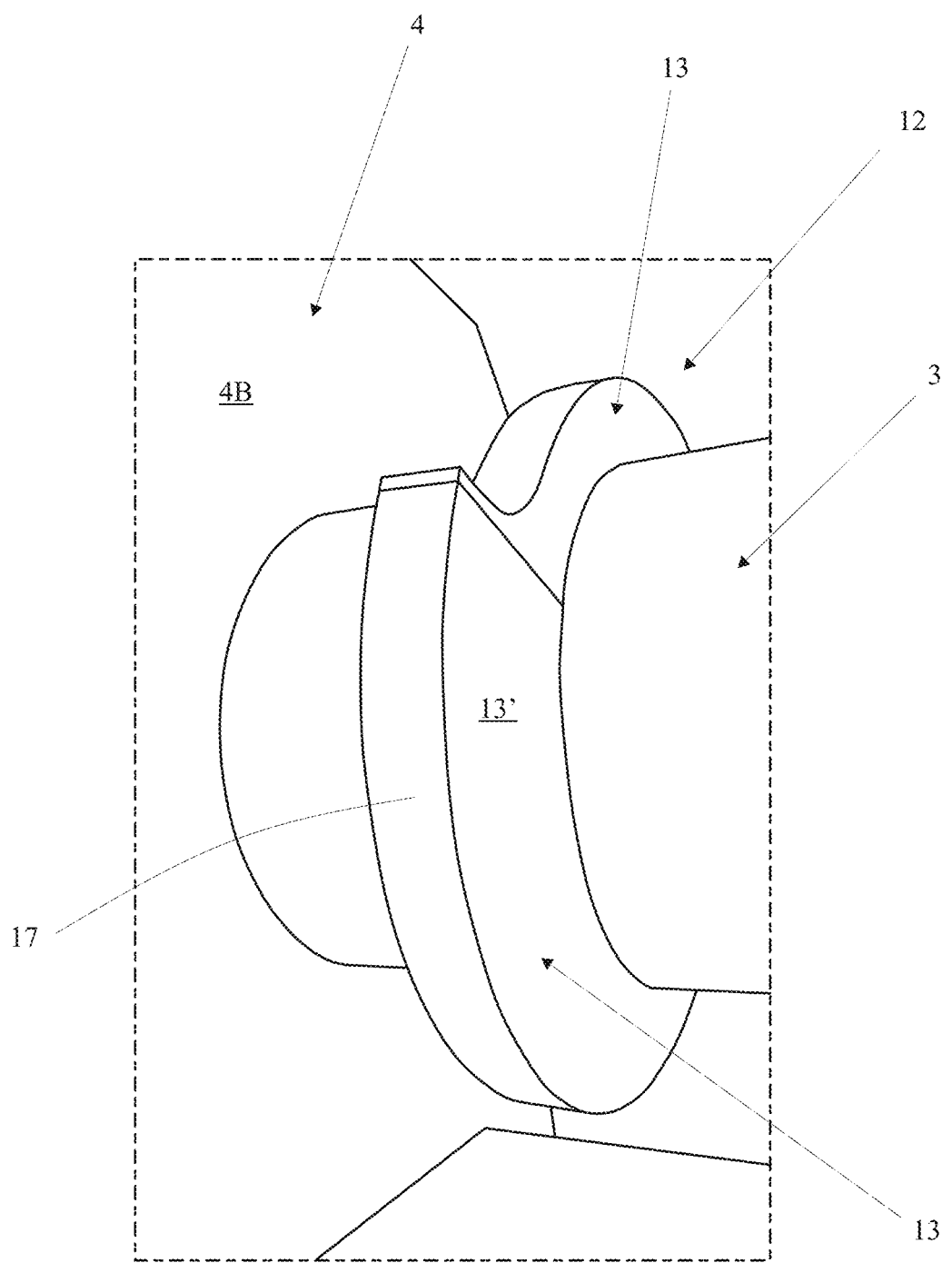
FIG. 4 shows a detail of the present disc screen, relative to a shaped ring.
Figure 5:
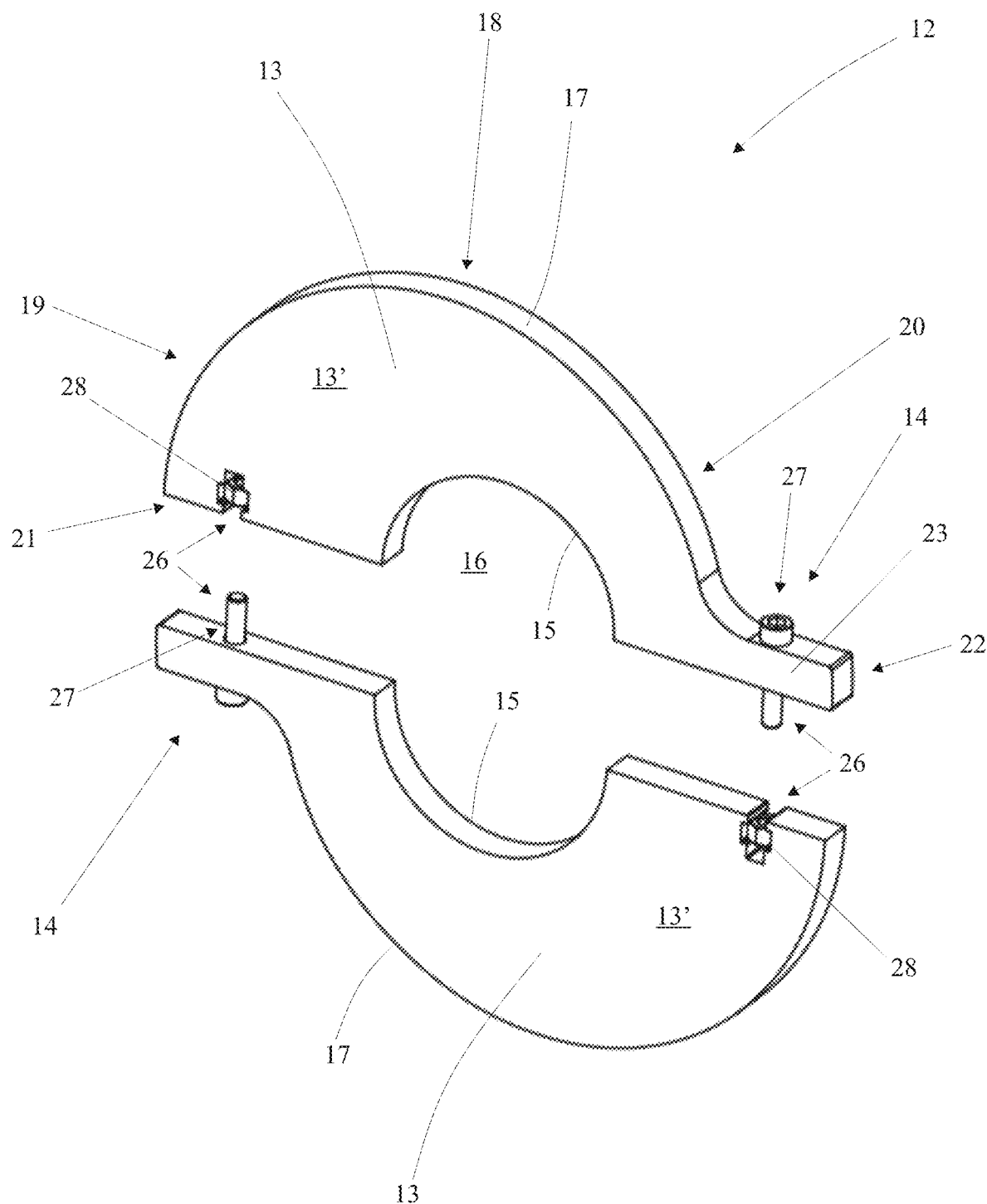
FIG. 5 shows an exploded view of a shaped ring of the present disc screen, in accordance with a first embodiment variant.

With reference to the examples of FIGS. 4 and 5, each shaped ring 12 comprises at least two sectors 13, each of which is extended for a given arc of circumference around the second rotation axis R2 of the shaped ring 12 itself, and removable locking elements 14, which are mechanically connected to the sectors 13 and removably fix together the latter, in order to close the shaped ring 12 around the corresponding rotation shaft 3, such that it remains constrained around the latter.

Due to the aforesaid arrangement of the shaped rings 12, it is possible to modify, in an extremely easy manner, the screening surface by simply coming to fix the shaped rings 12 around the rotation shafts 3 between successive pairs of discs 4. The fixing of such shaped rings 12 is extremely quick and easy due to removable locking elements 14 (regarding which, hereinbelow, several particular embodiments will be described).

Then, in order to modify the screening surface, it will no longer be necessary to dismount all of the discs 4 and other components of the disc screen 1 (as in the screens of known type), but it will be sufficient to loosen the removable locking elements 14 which connect the two sectors 13 and move them onto the rotation shaft 3, varying the distance between the shaped rings 12 and the discs 4 and therefore varying the screening surface, or add the shaped rings 12 (in a suitable number and positioning) which will come to reduce the screening surface, as a function of the specific sizing of the residues to be screened.

According to the invention, each shaped ring 12 is extended, transversely to the second rotation axis R2, between an internal edge 15, which defines a through opening 16 crossed by the corresponding rotation shaft 3, and an external edge 17, which is extended around the second rotation axis R2, enclosing the aforesaid internal edge 15 at its own interior.

In accordance with the particular examples of the enclosed figures, internal edge 15 of the shaped ring 12 has circular shape. Of course, such internal edge 15 can also have a different shape (e.g. polygonal) as a function for example of the shape of the external surface of the rotation shaft 3 (or of the sleeve 40).

The external edge 17 of each shaped ring 12 comprises at least one thrust section 18, with convex shape and substantially curved.

As discussed in detail hereinbelow, such thrust section 18 of the external edge 17 is adapted to intercept a component of the solid material (in particular components of light material, such as filamentous plastic components) and, following the rotation of the corresponding shaped ring 12, to push such component outside of the lateral spaces SL between the discs 4, in particular pushing the material in the advancing direction A towards the outlet door of the disc screen 1, such to prevent possible obstructions or entangling susceptible of blocking the correct operation of the disc screen 1.

In particular, the claimed arrangement of the shaped rings 12 allows opposing the drawbacks shown by the prior art, by preventing residues with sizing different from that to be screened and filamentous residues, which could be potentially twisted around the rotation shafts 3, from being moved away from the lateral interspaces SL between the discs 4 and made to proceed in the advancing direction A, thus decreasing the maintenance required by the disc screen 1 and increasing the screening efficiency.

Figure 6:
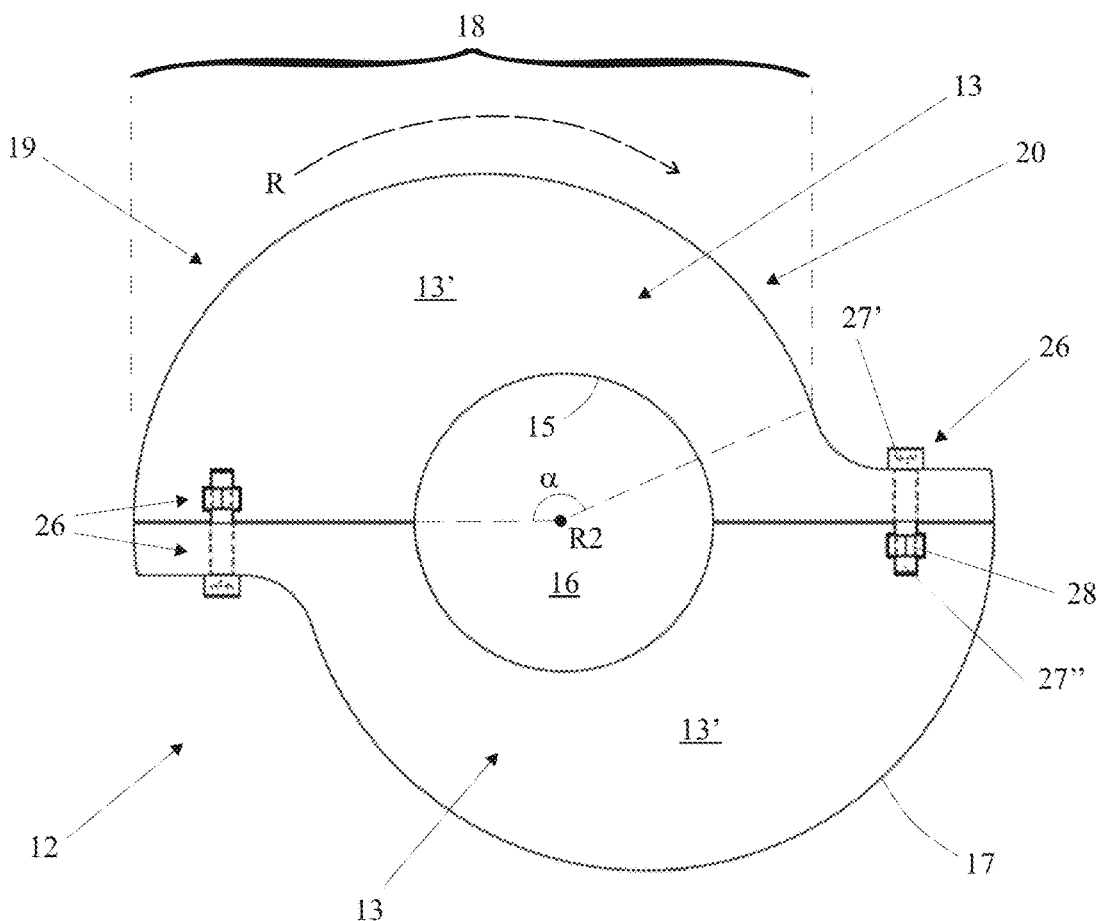
FIG. 6 shows a side view of the shaped ring of FIG. 5.
Figure 7:
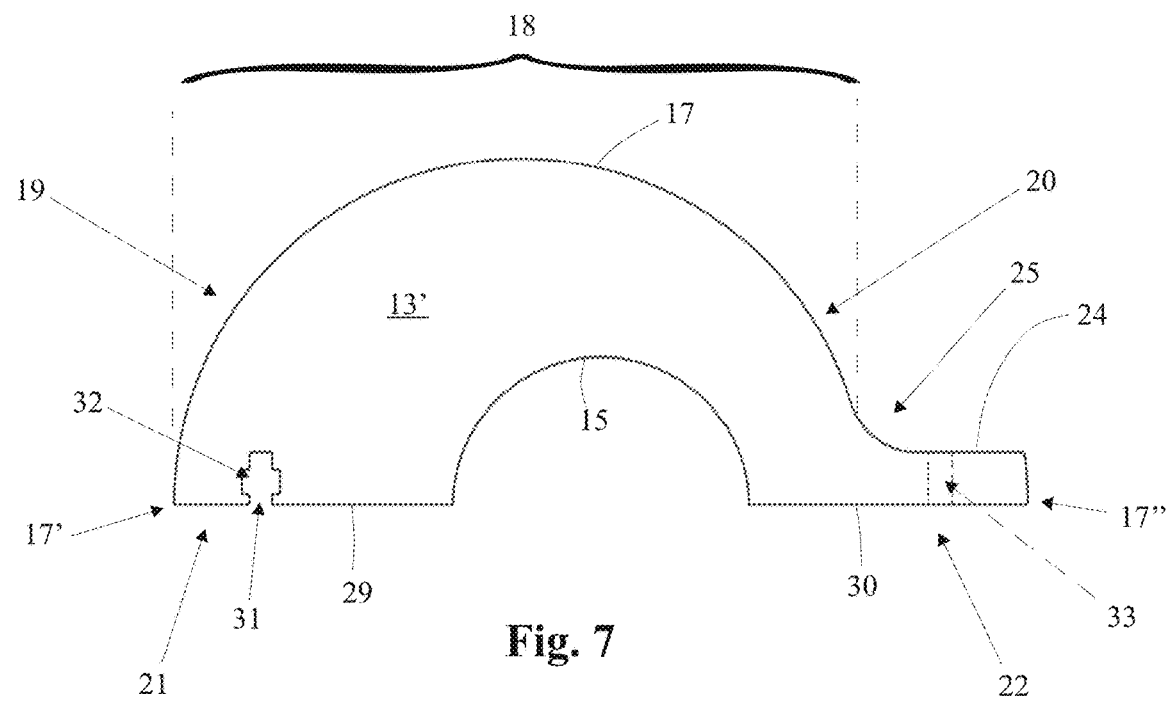
FIG. 7 shows a side view of a sector of the ring of FIG. 5.
Figure 8:
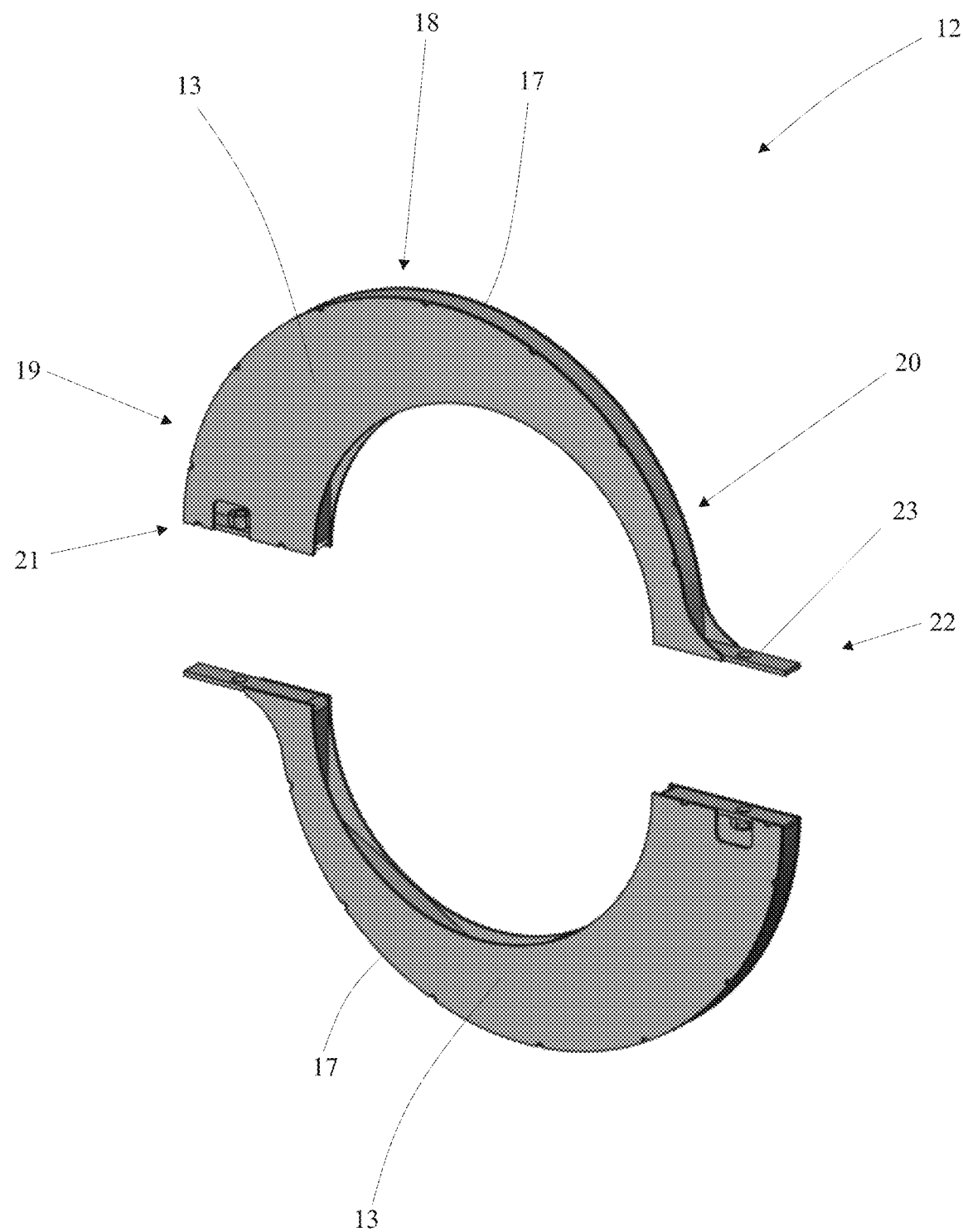
FIG. 8 shows an exploded view of a shaped ring of the present disc screen, in accordance with a second embodiment variant.

According to the invention, with reference for example to FIGS. 6 and 7, the thrust section 18 of the external edge 17 of each shaped ring 12 is extended (around the second rotation axis R2) approaching the second rotation axis R2, according to sense in accordance with the rotation sense R of the shaped ring 12 when the latter is actuated to rotate following the rotation of the rotation shafts 3.

More in detail, the thrust section 18 is extended from a distal segment 19 to a proximal segment 20 closer to the second rotation axis R2 with respect to the distal segment 19.

In particular, the distal segment 19 of the thrust section 18 is radially extended at a different distance (in particular greater distance) than the proximal segment 20 from the second rotation axis R2, such that, following the rotation of the shaped ring 12, the part of the external edge 17, which intercepts the screening plane, varies its own height since the screening plane is cyclically affected by the distal portion 19 of the external edge 17 of the shaped ring 12, which is raised protruding from the screening plane (with respect to the proximal segment) in order to act against the solid material to be screened.

Such shape of the external edge 17 of the shaped ring 12 allows the thrust section 18, following the rotation of the shaped ring 12 itself, to intercept the solid material, conveying it towards the distal segment 19 of the thrust section 18 itself, in this manner pushing the solid material away from the rotation shaft 3 and preventing it from penetrating into the lateral space SL between the discs 4. Advantageously, each thrust section 18 of the shaped ring 12 is oriented according to the rotation sense R when the shaped ring 12 is actuated to rotate by the corresponding rotation shaft 3.

More in detail, in operation, when the shaped ring 12 is placed in rotation in the rotation sense R, the proximal segment 20 of the thrust section 18 of the external edge 17 precedes the distal segment 19. In this manner, the solid material is first intercepted by the proximal segment 20 of the thrust section 18 and then by the distal segment 19, which moves it away from the rotation shaft 3 and, therefore, pushes it outside the lateral space SL between the discs 4 and in the advancing sense due to the particular extension of the thrust section 18.

Advantageously, the distal portion 19 of the thrust section 18 delimits (radially outward) a widened part of the shaped ring 12, and the proximal portion 20 delimits (radially outward) a narrow part of the shaped ring 12 having width (defined by the radial distance between the internal edge 15 and the external edge 17) smaller than the width of the widened part. Such shape ensures that the aforesaid widened part of the shaped ring 12 (following the rotation of the latter) cyclically acts on the screening plane, acting thrustingly against the solid material to be screened, as described above.

Preferably, the thrust section 18 of the external edge 17 delimits an eccentric portion of the shaped ring 12 placed in an eccentric manner with respect to the second rotation axis R2. In this manner, in particular, such eccentric portion, following the rotation of the shaped ring 12, intercepts the screening plane, determining the above-described thrust effect of the solid material.

Advantageously, the external edge 17 of the shaped ring 12 comprises at least two thrust sections 18, each placed on the corresponding sector 13 of the shaped ring 12, preferably distributed in a uniform manner around the second rotation axis R2.

In particular, the external edge 17 has multiple distal segments 19 that are separated by corresponding proximal segments 20, such that the distal segments 19 and the proximal segments 20 are placed alternated with respect to each other around the second rotation axis R2.

With reference to the examples illustrated in the enclosed figures, the external edge 17 of each shaped ring 12 comprises two said thrust sections 18 placed in diametrically opposite position with respect to the second rotation axis R.

Suitably, the substantially curved shape of the thrust section 18 is defined by a curvilinear line (e.g. rounded). In accordance with a different non-illustrated embodiment, the substantially curved shape of the thrust section 18 is defined by a dashed linear section.

Advantageously, with reference to the examples of FIGS. 6 and 7, the thrust section 18 of the external edge 17 has substantially semicircular shape with center spaced from the second rotation axis R2, according to a radial direction with respect to the second rotation axis R2 itself.

Preferably, the thrust section 18 in substance defines a semi-circle having the diameter intercepted by the second rotation axis R2. In particular, the center of the semicircle is spaced from the second rotation axis R2, such that, one end of the diameter is closer to the rotation axis R2 (at the proximal segment 20 of the thrust section 18) and the other end is further away from the second rotation axis R2 (at the distal segment 19 of the thrust section 18).

Each sector 13 of the shaped ring 12 is extended, around the second rotation axis R2 (substantially as an annular sector), between a first end 21, which is positioned at the distal portion 19 of the thrust section 18 of the external edge 17, and a second end 22, which is positioned at the proximal segment 20 of the thrust section 18 of the external edge 17.

In particular, the part of the external edge 17 defined by each sector 13 is extended between a first end 17' intercepted by the first end 21 of the sector 13 (and which delimits, on such first end 21, the distal segment 19) and a second end 17" intercepted by the second end 22 of the sector 13 (and which delimits, on such second end 22, the proximal segment 20).

As is visible in the examples illustrated in the enclosed figures, the proximal segment 20 of the thrust section 18 of each sector 13 is placed recessed (i.e. radially closer to the second rotation axis R2) with respect to the first end 21 of the adjacent sector 13, in particular in this manner defining a discontinuous progression of the external edge 17 of the shaped ring 12 at the proximal segment 20 of each thrust section 18.

Advantageously, such configuration of the external edge 17 of the shaped rings 12 allows the latter, during their rotation, to make the material hop forward in order to facilitate the advancing of the material to convey downstream and prevent the undesired penetration thereof between the discs 4.

Suitably, the proximal segment 20 of the thrust section 18 is placed between the distal segment 19 and the aforesaid connector concavity 25.

In particular, the proximal segment 20 of the thrust section 18 of each sector 13 is placed recessed with respect to the first end 21 of the adjacent sector 13.

Advantageously, the second end 22 of each sector 13 is connected, by means of the aforesaid removable locking elements 14, to the first end 21 of the adjacent sector 13 according to the extension of the shaped ring 12 around the second rotation axis R2.

Suitably, the sectors 13 are connected to each other at the respective ends 21, 22 in a manner such to circumferentially close the through opening 16 of the shaped ring 12 around the second rotation axis R2.

Advantageously, according to the examples illustrated in the enclosed figures, each shaped ring 12 comprises two sectors 13, each of which extended around the second rotation axis R2 for a circular sector with angle of 180°.

In particular, each sector comprises, on the corresponding part of the external edge 17, a corresponding thrust section 18 placed in diametrically opposite position with respect to the thrust section 18 of the other sector 13.

Preferably, in the event in which the shaped ring 12 comprises two sectors 13, the first end 21 and the second end 22 are placed in diametrically opposite position with respect to each other, with respect to the second rotation axis R2, with the first end 21 of one of the sectors 13 connected to the second end 22 of the other sector 13.

Advantageously, each thrust segment 18 of the external section 17 of each shaped ring 12 is extended around the corresponding second rotation axis R2 for an extension angle α of at least 120°, in particular in this manner allowing the exercising of its thrust action on the material for a significant arc of rotation of the shaped ring 12, ensuring an effective action on the material to be advanced. Advantageously, with reference to the embodiments illustrated in FIGS. 4-8, the sectors 13 of each ring 12 have substantially the same shape and they are placed in rotated position with respect to each other, around an axis passing through the second rotation axis R2 and orthogonal to the diameter of the shaped ring 12 passing through the ends 21, 22 of the sectors 13. In this manner, in particular, it is possible to use a same mold for making all the sectors 13 of the shaped ring 12.

Advantageously, in accordance with all the embodiments illustrated in the enclosed figures, the external edge 17 of each shaped ring 12 is provided with a concave segment 25 placed between the proximal segment 20 of the thrust section 18 of each sector 13 and the first end 21 of the adjacent sector 13. More in detail, such concave segment 25 is defined by the recessed position of the proximal segment 20 of each sector 13 with respect to the first end 21 of the adjacent sector 13.

Advantageously, the concave segment 25 of the shaped ring 12 is oriented in opposite manner with respect to the rotation sense R when the shaped ring 12 is actuated to rotate by the corresponding rotation shaft 3, in particular such to prevent the material to be screened (e.g. that filiform or sheet-like) from clinging to such concave segment 25 and being driven towards the rotation shaft 3.

Preferably, the second end 22 of each sector 13 comprises a projecting portion 23, which is extended, away from the second rotation axis R2, radially protruding with respect to the proximal segment 20 of the thrust section 18 and carries the removable locking elements 14 engaged therewith.

Advantageously, the aforesaid projecting portion 23 is extended mainly in radial direction with respect to the second rotation axis R2.

In particular, the projecting portion 23 is radially extended up to one end thereof, on the external edge 17, substantially flush with the first end 17' of the part of the external edge 17 of the adjacent sector 13.

Suitably, the projecting portion 23 defines a radial segment 24 of the external edge 17, which is extended between the thrust section 18 and the second end 17" of the part of the external edge 17 itself of the corresponding sector 13.

Advantageously, the aforesaid radial segment 24 is connected to the proximal segment 20 of the thrust section 18 through the aforesaid concave segment 25 of the external edge 17 of the sector 13.

In accordance with a first embodiment variant of the sector 13, illustrated in the examples of FIGS. 5-7, the projecting portion 23 is made in a single body with the remaining part of the sector 13 itself. In accordance with a second embodiment variant, illustrated in the example of FIG. 8, the projecting portion 23 is fixed, e.g. via welding, to the remaining part of the sector 13 (and is for example obtained by means of a metal plate).

Advantageously, each sector 13 of the shaped ring 12 has substantially plate-like shape and is provided with two faces 13', directed in opposite sense with respect to each other, preferably flat.

Suitably, the sector 13 has rigid shape and is for example made of metallic material, plastic material, PVC or another material.

Advantageously, in accordance with the embodiments illustrated in the enclosed figures, the removable locking elements 14 comprise screw attachment systems 26, preferably each placed to connect the first end 21 of each sector 13 with the second end 22 of the adjacent sector 13.

In particular, with reference to FIGS. 5 and 6, each screw attachment system 26 comprises a bolt having a screw 27 and a nut 28. In particular, the screw 27 is provided with a head 27' and with a threaded stem 27' screwed to the nut 28. Advantageously, with reference to the examples of FIGS. 6 and 7, the first end 21 of each sector 13 comprises a first radial wall 29 and the second end 22 of each sector 13 comprises a second radial wall 30 placed in abutment against the first radial wall 29 of the adjacent sector 13.

For example, the first radial wall 29 is placed directly in abutment against the second radial wall 30, or by means of the interposition of one or more suitable spacers.

In particular, the radial walls 29, 30 are placed to connect between the internal edge 15 and the external edge 17 of the corresponding sector 13.

According to the examples illustrated in the enclosed figures, the radial walls 29, 30 of each sector 13 have rectilinear section with radial section with respect to the second rotation axis R2. Of course, such radial walls 29, 30 can have different section (e.g. curved) and different tilt (e.g. tangent to the internal edge 15), without departing from the protective scope of the present patent.

Preferably, the first end 21 of each sector 13 is provided with a first hole 31, which is obtained starting from the first radial wall 29 and is provided with an enlarged seat 32 placed in the sector 13 internally spaced from the first radial wall 29. In particular, the enlarged seat 32 (e preferably the internal first hole 31) is extended in a through manner between the two opposite faces 13' of the sector 13.

The aforesaid enlarged seat 32 houses the corresponding nut 28 of the screw attachment system 26.

The radial portion 23 of the second end 22 of each sector 13 is provided with a second hole 33, which is extended in a through manner between the second radial wall 30 and the external edge 17 (in particular the radial segment 24 of the latter) and is aligned with the first hole 31 of the first end 21 of the adjacent sector 13.

The screw 27 of the screw attachment system 26 is inserted in the first hole 31 of the first end 21 of the sector 13 and in the second hole 33 of the second end 22 of the adjacent sector 13, and is engaged via screwing with the nut 28 placed in the enlarged seat 32 of the first hole 31 so as to retain the aforesaid first end 21 joined with the second end 22.

In particular, the threaded stem 27' of the screw 27 is inserted in the second hole 33 of the second end 22 and in the first hole 31 of the first end 21, being screwed with the nut 28 placed in the enlarged seat 32 of the first hole 31, up to bringing the head 27' of the screw 27 in abutment against the projecting portion 23, so as to tighten the latter against the first radial wall 29 of the first end 21.

In accordance with the embodiments illustrated in FIGS. 4-8, all the sectors 13 have, at their ends 21, 22, the same type of coupling at the ends 22, 21 of the adjacent sector 13, like that of the above-described example.

In accordance with a different embodiment not illustrated in the enclosed figures, the removable locking elements 14 can comprise a hinge, in particular with articulation axis parallel to the second rotation axis R2 of the shaped ring 12, placed as a rotatable connection of a pair of the first and second end 21, 22 of the sectors 13, and for example a screw system (like that described above) on order to fix together the other pair of the first and second end 21, 22. In this manner the two sectors 13 of the shaped ring 12 can be opened, by rotating them around the axis of the hinge in order to receive the rotation shaft 3 or to be removed from the latter, maintaining a pair of the first and second end 21, 22 (rotatably) connected to each other.

In accordance with a third embodiment variant of the sectors 13, illustrated in the example of FIGS. 9 and 10, the first end 21 of one of the sectors 13 is provided with a coupling seat 34, and the projecting portion 23 of the other (adjacent) sector 13 is provided with an engagement appendage 35 with shape corresponding to the coupling seat 34.

Advantageously, the engagement seat 34 is provided with at least one lateral opening on at least one face 13' of the sector 13 and, preferably, is extended in a through manner between the two opposite faces 13' of the sector 13 itself. Suitably, the engagement seat 34 is provided with a front opening 34' in particular made on the internal edge 15 and/or on the first radial wall 29 of the corresponding sector 13.

The engagement appendage 35 of a sector 13 is coupled in the coupling seat 34 of the other sector 13 via shaping coupling with such coupling seat 34.

Such arrangement allows facilitating the positioning of the sectors 13 in order to couple them to the rotation shaft 3.

Advantageously, in accordance with an optional characteristic, the engagement appendage 35 of a sector 13 is inserted in the coupling seat 34, with at least rotatable coupling (with axis parallel to the second rotation axis R2) the first end 21 of a sector 13 and the projecting portion 23 of the other sector 13.

Suitably, such at least rotatable coupling (and in particular rotation-translation coupling) is obtained by sliding the engagement appendage 35 within the coupling seat 34, such that a sector 13 can rotate with respect to the next in one rotation sense or in the opposite sense, by moving the engagement appendage 35, respectively, insertingly or extractingly with respect to the engagement seat 34.

In particular, the coupling seat 34 and the engagement appendage 35 have at least partially curved shape.

The other ends 21, 22 of the sectors 13 are fixed to each other by means of the screw attachment system 26, for example like that described above.

In detail, the projecting portion 23 of the sector 13 provided with the engagement seat 34 is fixed to the first end 21 of the other sector 13 (provided with the engagement appendage 35) by means of the aforesaid screw attachment system 26.

In operation, in order to couple one sector 13 to the next, the engagement appendage 35 of a sector 13 are inserted in the engagement seat 34 of the other sector 13, for example by means of the lateral opening or the front opening 34' of the latter, in a manner such to correctly position the sectors 13. Hence, the screw system 26 is applied at the other ends 21, 22 of the sectors 13 in order to fix them integrally with each other.

Figure 11:
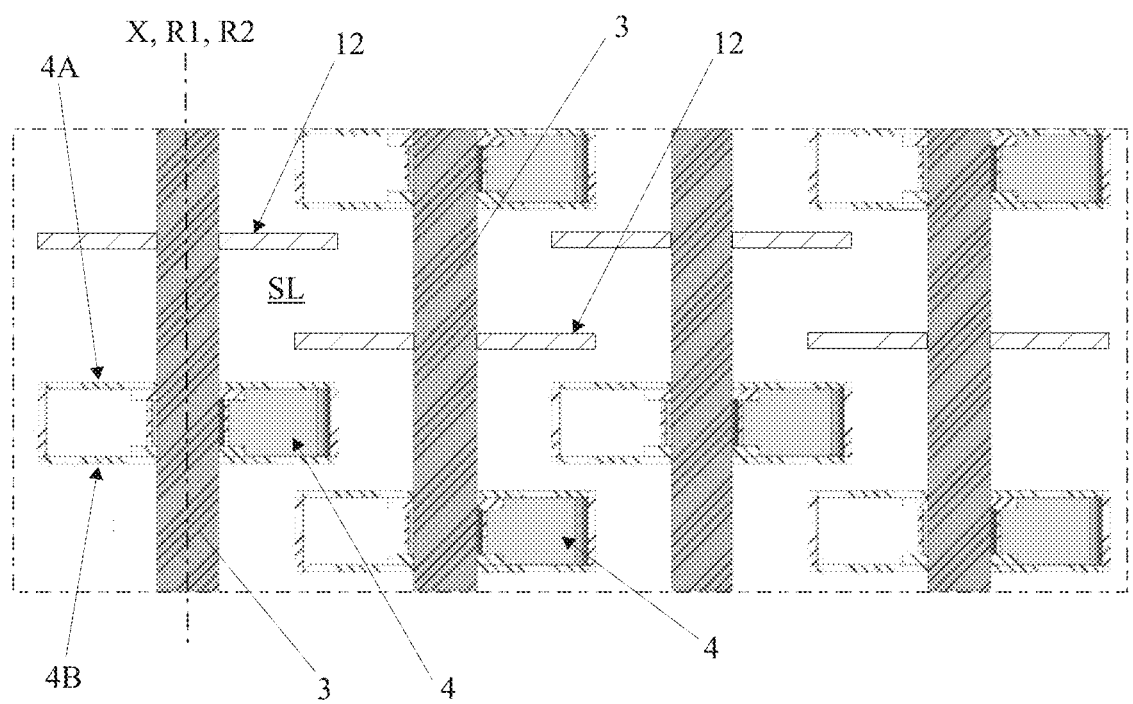
FIG. 11 shows a plan view of a detail of the present disc screen, relative to part of the rotation shafts, in accordance with a first embodiment of the present invention.

In accordance with a first embodiment of the present invention, illustrated in FIG. 11, the shaped rings 12 are directly fixed to the rotation shafts 3, arranging for example the internal edge 15 of the shaped ring 12 with shape corresponding to that of the external surface of the rotation shaft 3.

Figure 12:
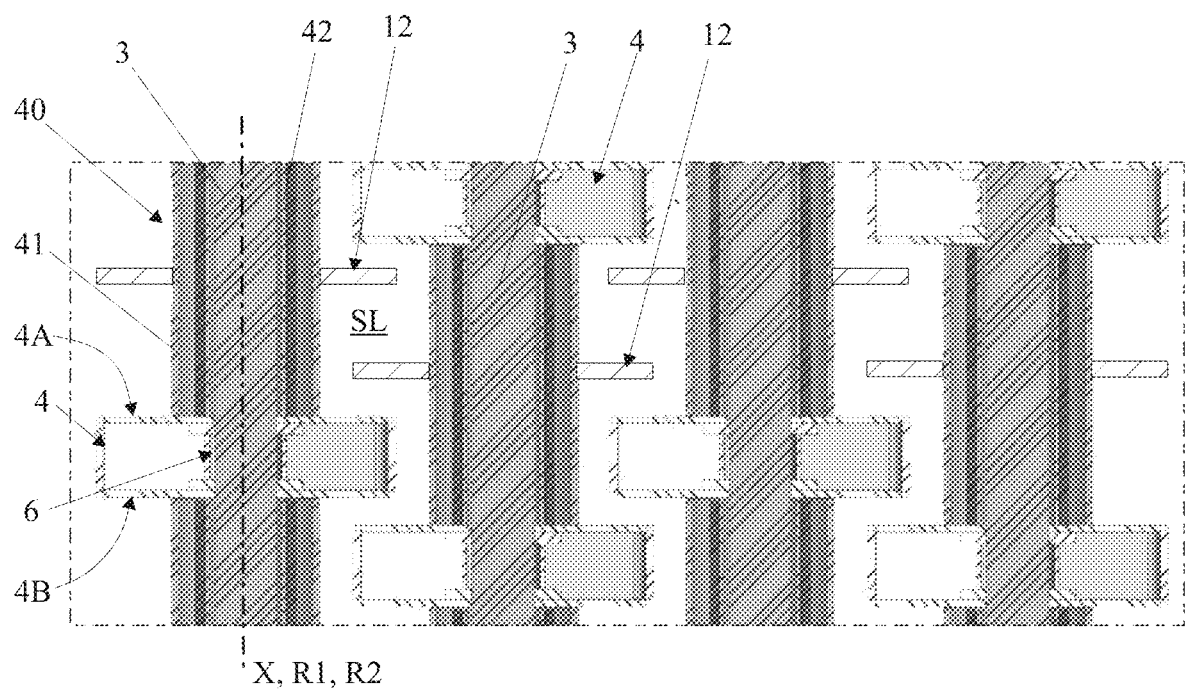
FIG. 12 shows a plan view of a detail of the present disc screen, relative to part of the rotation shafts, in accordance with a second embodiment of the present invention.

In accordance with a second embodiment of the present invention, illustrated in FIG. 12, the disc screen 1 comprises a plurality of sleeves 40 interposed between pairs of successive discs 4 (along the extension axis X of the corresponding rotation shaft 3) and mounted externally idle on the rotation shaft 3.

In particular, each sleeve 40 comprises a tubular body 41 extended (according to the extension axis X of the corresponding rotation shaft 3) between two opposite end edges, placed at the corresponding lateral faces 4A, 4B of the two discs 4, between which the sleeve 40 is interposed.

The disc screen 1 comprises preferably a plurality of spacer tubular bodies 42, each of which externally mounted on the rotation shaft 3 and interposed and in abutment between the lateral faces 4A, 4B of two discs 4 in succession. In this manner, in particular, the discs 4 are placed in succession along the rotation shaft 3 alternated with the spacer tubular bodies 42 which, pressed between the contiguous discs 4, rotate together with the latter. Suitably, the spacer tubular bodies 42 have length slightly greater than that of the sleeves 40 in order to allow the idle rotation of the latter.

In accordance with the aforesaid second embodiment, the shaped rings 12 are indirectly connected to the rotation shafts 3 through the interposition of sleeves 40, mounted externally idle on the rotation shafts 3.

In addition or as an alternative, the shaped rings 12 are mounted directly on the rotation shafts 3, for example in a manner corresponding to that described above for the first embodiment lacking sleeves.

In this second embodiment, in particular the shaped rings 12 mounted on the sleeves 40, following the rotation of the rotation shafts 3, are brought to rotate via inertia (together with the sleeves 40) in the same rotation sense R as the rotation shafts 3. The disc screen 1 for separating solid materials thus conceived therefore attains the pre-established objects.

The contents of the Italian patent application number 102020000014104, from which this application claims priority, are incorporated herein by reference.

The invention claimed is:

1. A disc screen for separating solid materials, said disc screen comprising:
   a support structure;
   a plurality of rotation shafts rotatably mounted on said support structure and positioned parallel to each other;
   a plurality of discs, which are fixed to said rotation shafts and are positioned in succession, spaced one from the next, along the corresponding said rotation shaft; wherein each of said discs is provided with a first rotation axis parallel to the corresponding said rotation shaft;
   a drive system mechanically connected to said rotation shafts in order to actuate said rotation shafts and said discs to rotate around said first rotation axis in a rotation sense;
   multiple shaped rings, each of which is removably mounted around a corresponding said rotation shaft, is provided with a second rotation axis parallel to the corresponding said rotation shaft, is positioned between two successive said discs mounted on said corresponding rotation shaft, and is actuatable to rotate around the second rotation axis in said rotation sense;
wherein each said shaped ring comprises:
at least two sectors, each of which is extended for a given arc of circumference around said second rotation axis;
removable locking elements, which are mechanically connected to said sectors and removably fix together said sectors, in order to close said shaped ring around the corresponding said rotation shaft;
wherein each said shaped ring is extended, transversely to said second rotation axis, between an internal edge, which defines a through opening crossed by the corresponding said rotation shaft, and an external edge, which is extended around said second rotation axis enclosing said internal edge at the interior of said external edge;
wherein said external edge comprises at least two thrust sections, with convex shape and substantially curved, each placed on the corresponding said sector of said shaped ring;
wherein each said thrust section is extended from a distal segment to a proximal segment, wherein said proximal segment is closer to said second rotation axis than said distal segment;
wherein said thrust section is oriented according to said rotation sense;
wherein each said sector is extended, around said second rotation axis, between a first end, which is positioned at the distal segment of the thrust section of said external edge, and a second end, which is placed at the proximal segment of the thrust section of said external edge and is connected, by said removable locking elements, to the first end of an adjacent said sector;
wherein the second end of each said sector comprises a projecting portion, which is extended, away from said second rotation axis, radially protruding with respect to the proximal segment of said thrust section.

2. The disc screen of claim 1, wherein the external edge of said shaped ring is provided with a concave segment placed between the proximal segment of the thrust section of each said sector and the first end of the adjacent said sector.

3. The disc screen of claim 1, wherein said thrust section is extended around said second rotation axis for an extension angle of at least 120°.

4. The disc screen of claim 1, wherein each shaped ring comprises two said sectors, each of which is extended around said second rotation axis for a circular sector with angle of 180°.

5. The disc screen of claim 4, wherein the external edge of each said shaped ring comprises two said thrust sections placed in a diametrically opposite position with respect to said second rotation axis.

6. The disc screen of claim 1, wherein the thrust section of said external edge delimits an eccentric portion of said shaped ring, wherein said eccentric portion is placed in an eccentric manner with respect to said second rotation axis.

7. The disc screen of claim 6, wherein the thrust section of said external edge has substantially semicircular shape with center spaced from said second rotation axis.

8. The disc screen of claim 1, wherein said projecting portion carries said removable locking elements engaged therewith.

9. The disc screen of claim 1, wherein said removable locking elements comprise at least one screw connection system.

10. The disc screen of claim 8, wherein said removable locking elements comprise a screw connection system;
wherein the first end of each said sector comprises a first radial wall and the second end of each said sector comprises a second radial wall placed in abutment against the first radial wall of the adjacent said sector;
wherein said first end is provided with a first hole, which is obtained starting from said first radial wall and is provided with a widened seat placed in said sector internally spaced from said first radial wall, and the projecting portion of said second end is provided with a second hole, which is extended in a through manner between said second radial wall and said external edge and is aligned with the first hole of the first end of said adjacent sector;
wherein said screw connection system comprises multiple bolts, each of which comprises a screw, which is inserted in the first hole of said first end of said sector and in the second hole of the second end of said adjacent sector, and a nut, which is housed in the widened seat of said first hole and is engaged via screwing by said screw.

11. The disc screen of claim 4, wherein the second end of each said sector comprises a projecting portion, which is extended, away from said second rotation axis, radially protruding with respect to the proximal segment of said thrust section, and carries said removable locking elements engaged therewith;
wherein said removable locking elements comprise a screw connection system;
wherein the first end of one of said sectors is provided with a coupling seat, and the projecting portion of the other said adjacent sector is provided with an engagement appendage, which has shape corresponding to said coupling seat and is engaged via shape coupling with said engagement seat;
wherein the projecting portion of said one of said sectors (13) is fixed to the first end of the other of said sectors by said screw connection system.

* * * * *